/

US010839104B2

(12) United States Patent
Balzer et al.

(10) Patent No.: US 10,839,104 B2
(45) Date of Patent: Nov. 17, 2020

(54) OBFUSCATING INFORMATION RELATED TO PERSONALLY IDENTIFIABLE INFORMATION (PII)

(71) Applicant: Microsoft Technology Licensing, LLC, Redmond, WA (US)

(72) Inventors: Andreas Balzer, Dublin (IR); David Mowatt, Dublin (IR); Muiris Woulfe, Dublin (IR)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 184 days.

(21) Appl. No.: 16/004,128

(22) Filed: Jun. 8, 2018

(65) Prior Publication Data

US 2019/0377901 A1 Dec. 12, 2019

(51) Int. Cl.
*H04L 29/06* (2006.01)
*G06F 21/62* (2013.01)

(52) U.S. Cl.
CPC ...... *G06F 21/6254* (2013.01); *H04L 63/0421* (2013.01)

(58) Field of Classification Search
CPC .. G06F 21/6254; G06F 17/2785; G06F 17/27; H04L 63/0421; G10L 25/48; H04M 3/5175
See application file for complete search history.

(56) References Cited

U.S. PATENT DOCUMENTS

| 6,275,824 | B1 | 8/2001 | O'Flaherty et al. |
| 6,397,224 | B1 | 5/2002 | Zubeldia et al. |
| 7,617,393 | B2 | 11/2009 | Betz et al. |
| 7,711,749 | B2 | 5/2010 | Brodie et al. |
| 9,202,085 | B2 | 12/2015 | Mawdsley et al. |

(Continued)

OTHER PUBLICATIONS

Scannapieco, et al., "Privacy Preserving Schema and Data Matching", in Proceedings of the ACM SIGMOD international conference on Management of data, Jun. 11, 2007, 12 Pages.

(Continued)

*Primary Examiner* — Amir Mehrmanesh
(74) *Attorney, Agent, or Firm* — Michael Best & Friedrich LLP

(57) ABSTRACT

A system for protecting personally identifiable information (PII) associated with audio, image and video. The system includes an output device and a processor. The processor receives a document including an audio, an image, or a video containing both non-personally identifiable information and personally identifiable information, scans the document for a voice, a face, a graphically rendered text, or a personal attribute, match the voice, face, graphically rendered text, or personal attribute with records in a database to determine whether the voice, face, graphically rendered text, or personal attribute in the document is associated with personally identifiable information. The processor also determines a start time and an end time associated with the presence of the voice or video in response to determining that the voice, or video is associated with PII, generates an obfuscated audio or a video between the start time and the end time, and causes the output device to output the obfuscated audio, graphically rendered text or video.

20 Claims, 9 Drawing Sheets

(56) References Cited

U.S. PATENT DOCUMENTS

| | | | |
|---|---|---|---|
| 9,355,273 B2 | 5/2016 | Stevens et al. | |
| 9,582,680 B2 | 2/2017 | Bilodeau et al. | |
| 9,684,799 B2 | 6/2017 | Bhogal et al. | |
| 2005/0065824 A1 | 3/2005 | Kohan | |
| 2005/0132070 A1 | 6/2005 | Redlich et al. | |
| 2006/0143459 A1 | 6/2006 | Villaron et al. | |
| 2009/0049069 A1 | 2/2009 | Aggarwal et al. | |
| 2011/0239113 A1 | 9/2011 | Hung et al. | |
| 2013/0266127 A1 | 10/2013 | Schachter et al. | |
| 2014/0372401 A1* | 12/2014 | Goldstein | G06F 16/638 707/706 |
| 2015/0195406 A1 | 7/2015 | Dwyer et al. | |
| 2015/0213288 A1 | 7/2015 | Bilodeau et al. | |
| 2016/0239668 A1 | 8/2016 | Bellert | |
| 2016/0283473 A1* | 9/2016 | Heinze | G06F 16/31 |
| 2017/0061138 A1* | 3/2017 | Lambert | H04L 63/18 |
| 2017/0177798 A1* | 6/2017 | Samuel | G06F 21/6254 |
| 2017/0207916 A1* | 7/2017 | Luce | H04L 9/14 |
| 2017/0249466 A1 | 8/2017 | Ben-yair et al. | |
| 2017/0264619 A1* | 9/2017 | Narayanaswamy | H04L 63/0281 |
| 2018/0268240 A1* | 9/2018 | Loce | G06K 9/00228 |
| 2018/0309775 A1* | 10/2018 | Zou | H04L 63/1416 |
| 2019/0138748 A1* | 5/2019 | Long | G06F 21/6254 |
| 2019/0377900 A1* | 12/2019 | Balzer | H04L 9/0894 |

OTHER PUBLICATIONS

"International Search Report and Written Opinion Issued in PCT Application No. PCT/US19/034778", dated Sep. 4, 2019, 14 Pages.

"International Search Report and Written Opinion Issued in PCT Application No. PCT/US2019/034774", dated Jul. 23, 2019, 13 Pages.

"Non-Final Office Action Issued in U.S. Appl. No. 16/003,739", dated Mar. 4, 2020, 14 Pages.

"Final Office Action Issued in U.S. Appl. No. 16/003,739", dated Jul. 8, 2020, 7 Pages.

* cited by examiner

OBFUSCATING INFORMATION RELATED TO PERSONALLY IDENTIFIABLE INFORMATION (PII)

FIELD

Embodiments described herein relate to obfuscating audio, image and video data related to personally identifiable information in a document.

BACKGROUND

Protection of personally identifiable information (PII) is required by governmental laws and regulations. Even when protection is not required, organizations may be motivated to protect personally identifiable information for various reasons such as fostering trust with customer and users or reducing legal risk. The management of personally identifiable and sensitive information has become particularly critical in an increasingly collaborative and electronic world. While the management of such information in a manner to prevent unauthorized access is often primarily focused on security, an equally important aspect of protection is helping user avoid accident disclosure, for example, through the simple exchange of electronic documents. Regardless of the reason, protecting personally identifiable information can be expensive, which ultimately increases costs to the organization attempting to keep personally identifiable information protected.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. The sole purpose of this summary is to present some concepts of one or more implementations of the present disclosure in a simplified form as a prelude to the more detailed description that is presented later.

With the implementation of governmental regulations (for example, the General Data Protection Regulation (GDPR)), organizations need to be able to effectively retrieve and (upon request) delete content and documents containing personally identifiable information. Existing ways of handling personally identifiable information include performing an internal audit, where a client submits to an organization a request associated with the client's personally identifiable information. Typically, an individual working for the organization performs a bulk query against all client documents and then performs an analysis of each document to determine whether the document includes personally identifiable information. Redaction of personally identifiable information is performed manually. The entire process can take days, weeks, or months.

Embodiments described herein include, among other things, a software application, which enables users within an organization to create, save, and share documents. The expression "documents" is used to mean database records, word processing documents, spreadsheets, presentations, portable document format (PDF) files, sound files, image files, videos etc. Embodiments described herein protect personally identifiable information by leveraging the organization's software service that allow for the creation and storing of data by creating an account or subscription with the organization, using the organization's email service or productive suite (for example, a document storage and collaboration suite such as Sharepoint; media streaming services, such as Azure Media Services and Microsoft Stream) or at the operating system level (for example, using a cloud based user directory with access control functionality such as Azure Active Directory). In some embodiments, the systems and methods discussed herein enable, among other things, instantaneous tagging of named individuals while a document is being authored, and thus enable faster, and in certain instances, almost instantaneous retrieval of all documents relating to that individual. Systems and methods discussed also enable deletion requests by a client to result in the original document being redacted rather than deleted. This ensures that when a document is shared, only authorized recipients may see personally identifiable information associated with the client. Additionally, any document that is sent outside of a trust boundary may be automatically deleted or have the PII automatically deleted.

An example embodiment includes a computer system for protecting personally identifiable information (PII) associated with an audio, image, or video data. The computer system includes an output device, and an electronic processor electrically connected to the output device. The electronic processor is configured to receive a document including an item selected from the group consisting of an audio, an image, and a video containing both non-personally identifiable information and personally identifiable information. The electronic processor is configured to scan the document for a voice or a personal attribute. The electronic processor is also configured to match the voice or the personal attribute with records in a database to determine whether the voice or the personal attribute in the document is associated with personally identifiable information. The electronic processor is also configured to determine a start time and an end time associated with a presence of the voice or the personal attribute in the document. The electronic processor is also configured to generate an obfuscated version of the document, wherein the voice or the personal attribute in the document is obfuscated between the start time and the end time, and generate a signal causing the output device to output the obfuscated version of the document.

Another example embodiment includes a method for protecting personally identifiable information of individuals. The method includes receiving, with an electronic processor, a document including an item selected from the group consisting of an audio, an image, or a video containing both non-personally identifiable information and personally identifiable information. The method also includes scanning, with the electronic processor, the document for a voice or a personal attribute. The method also includes matching, with the electronic processor, the voice or personal attribute with records in a database to determine whether the voice or the personal attribute in the document is associated with personally identifiable information. The method also includes determining a start time and an end time associated with the presence of the voice or the personal attribute in the document. The method also includes generating an obfuscated version of the document, wherein the voice or the personal attribute is obfuscated between the start time and the end time, and generating a signal causing the output device to output the obfuscated version of the document.

Another example embodiment includes scanning a video for PII located in embedded text, images, and/or transcribed audio (of video or audio files). In one example, time markers are set for when the PII starts and when it stops. In some embodiments, embedded text is redacted or "blacked out," for example, rendered with a black box placed on top of areas having PII. In one example, audio having PII information can be muted or modified such that the relevant PII cannot be retrieved. A client identifier reference may then be placed at that time (or position in the file) such that the system can replace the black box or audio with a substitution revealing the information (in some instances not the original content). In an another approach, the original content may be stored on a server that is then automatically fetched and rendered on the user's device with the same time markers and at the same visual position. Both media types (sound and video) can be scanned after the media has been created or during live-streaming while it is being recorded.

Another example embodiment includes a non-transitory computer-readable medium containing instructions that when executed by one or more electronic processors cause the one or more electronic processors to perform the set of actions. The set of actions include receiving a document including an item selected from the group consisting of an audio, an image, or a video containing both non-personally identifiable information and personally identifiable information. The set of actions also includes scanning the document for a voice, image, video or a personal attribute. The set of actions also includes matching the voice, image, video or personal attribute with records in a database to determine whether the voice, image, video or personal attribute in the document is associated with personally identifiable information. The set of actions also includes determining a start time and an end time associated with the presence of the voice, video or personal attribute in the document. The set of actions also includes generating an obfuscated version of the document, wherein the voice, image, video or the personal attribute in the document is obfuscated between the start time and the end time, and generating a signal causing the output device to output the obfuscated version of the document. In some embodiments, the audio of an individual's voice is removed and replaced with text-to-speech (for example, by using Cortana, or Apple's Siri voice). This is performed when the words spoken by the individual themselves do not have personally identifiable information, but the identity of the voice of the individual is apparent because the individual's voice is recognizable.

By the use of the techniques disclosed herein, one or more devices can be configured to, among other things, conserve resources with respect to power resources, memory resources, communications bandwidth resources, processing resources, and/or other resources while providing mechanisms for controlling and deleting personally identifiable information in content such as word processing files, audio data, and image data. Technical effects other than those mentioned herein can also be realized from an implementation of the technologies disclosed herein.

BRIEF DESCRIPTION OF THE DRAWINGS

The present disclosure will be better understood from the following detailed description read in light of the accompanying drawings, wherein like reference numerals are used to designate like parts in the accompanying description.

DETAILED DESCRIPTION

Embodiments of systems and methods for protecting personally identifiable information (PII) are described herein. The personally identifiable information protecting system is configured to detect and remove personally identifiable information within documents based on authorization level based rules provided to the system.

When electronic documents are created and edited using software applications (for example, using productive tools such as word processing applications or email applications), various forms of data (for example, personally identifiable information) are often created in the form of content in the documents or in the form of metadata. Controlling access to subsequent users and recipients of documents can protect personally identifiable information of individuals and ensures privacy for the users. As used herein, personally identifiable information (PII) includes anything that particularly identifies a particular entity (for example, a user, organization or content, etc.). This can mean any data collected about the users or provided by them unless they have explicitly authorized the organization to share that information. Some common examples of personally identifiable information include name, date of birth, biometric information (for example, facial image, finger print, an individual's voice, etc.), government issued identification number (for example, social security number (SSN), driver's license number, etc.), financial account information (for example, bank account number, credit card number, etc.), personal phone number, and mailing address. Other data that may be considered PII includes Internet protocol (IP) address, company name, and location information. PII may also be incorporated in free form data, for example document names, email headers, icons, images, audio and video data or any other data taken in aggregate that can be used to determine details about an entity (for example, a user, organization, or particular content).

Figure 1:
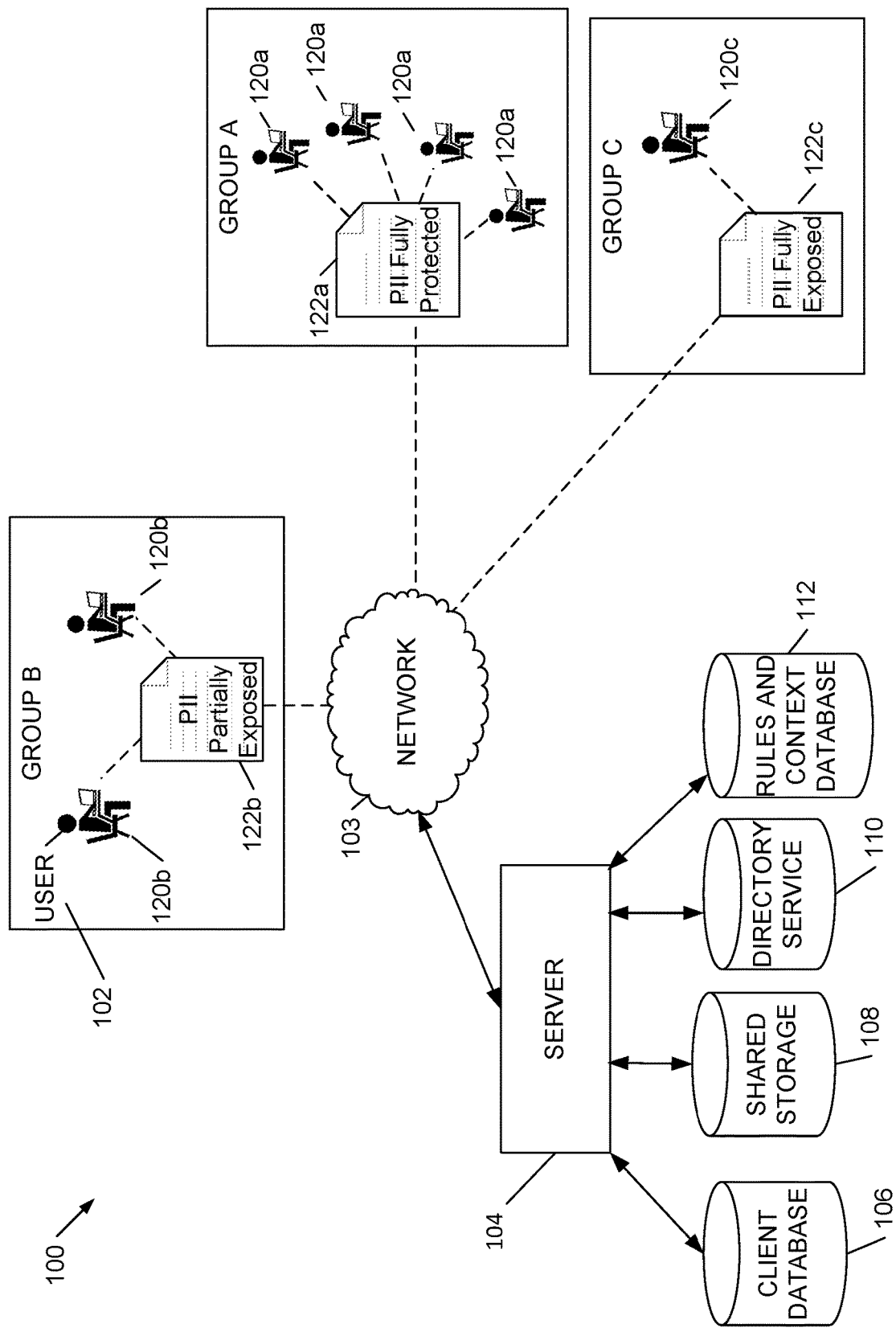
FIG. 1 illustrates an example of a personally identifiable information protecting system.

FIG. 1 illustrates an example of a personally identifiable information protecting system 100. In the example illustrated, the system 100 includes client devices 120a, 120b, 120c, 120d that accesses a server 104 via a network 103. The server 104 is connected to a client database 106, shared storage 108, and directory service 110 (for example, a database or an application that provides documents along with an associated level of authorization to view personally identifiable information in the documents) and rules and context database 112. The directory services 110 provides a data structure to manage several categories of users 102 including management of access credentials for the individual users 102 to view personally identifiable information. The system 100 may operate locally or in a distributed environment, such as in client-server or cloud services architectures. Any distributed components of the system 100 may communicate with each other or be accessed over at least one computer network, such as, but not limited to, the Internet, an intranet, a local area network, or a wide area network.

The term "clients," "consumers," "customers," or "subscribers" can be used interchangeably herein to refer to the users 102 using services provided using system 100. One or more users 102 can subscribe to, or otherwise register for, access to one or more software application(s) as a "user" of the software application(s). In some embodiments, a user can include an individual user 102 or a group of multiple users.

The client computing devices 120 (sometimes referred to herein as "client devices 120") can be implemented as any number of computing devices, including, without limitation, a personal computer, a laptop computer, a desktop computer, a portable communication device (for example, a mobile phone or a tablet), or other electronic device that can transmit and/or receive data over a network 103. The network(s) 103 is representative of many different types of networks, and includes wired and/or wireless networks that enable communications between the various entities in the system 100. In some configurations, the network(s) 103 can include the Internet, local area networks (LANs), wide area networks (WANs), a mobile telephone networks (MTNs), and other types of networks, possibly used in conjunction with one another, to facilitate communication between the server 104 and the client devices 120. Although some configurations are described in the context of a web-based system, other types of client/server-based communications and associated application logic could be used.

Figure 2:
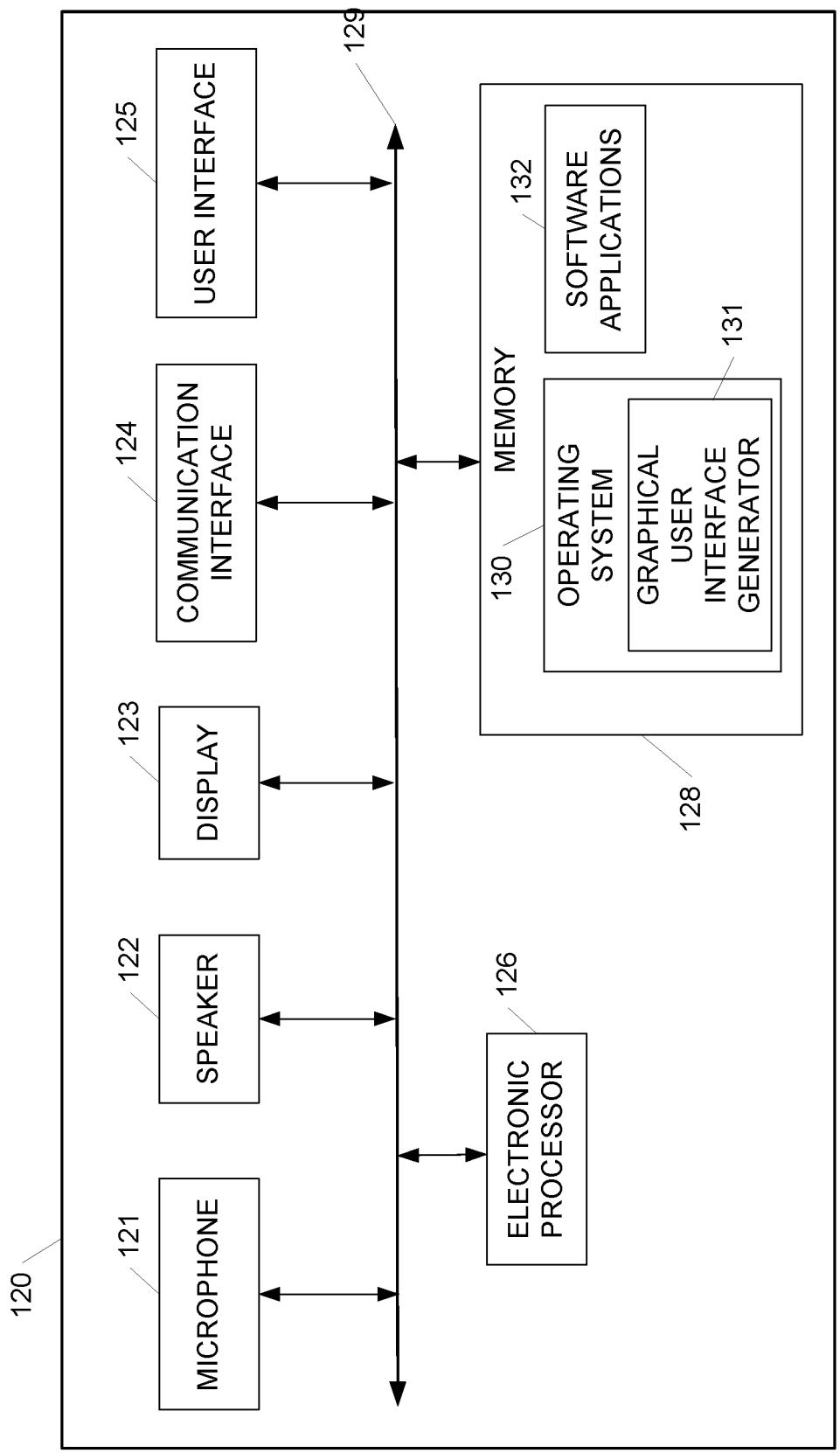
FIG. 2 is a block diagram of an example computing device shown in FIG. 1.

FIG. 2 is an example block diagram of a computing device 120 shown in FIG. 1. The computing device 120 includes a microphone 121, a speaker 122, a display 123, a communication interface 124, a user interface 125, an electronic processor 126, and a memory 128 coupled to a data bus 129. A graphical user interface generated by the computing device is displayed on the display 123.

The communication interface 124 provides the computing device 120 a communication gateway with an external network (for example, a wireless network, the Internet, etc.). The communication interface 124 may include, for example, an Ethernet card or adapter or a wireless local area network (WLAN) card or adapter (for example, IEEE standard 802.11a/b/g/n). The communication interface 124 may include address, control, and/or data connections to enable appropriate communications on the external network. The user interface 125 provides an input mechanism such as a keyboard that may be a physical keyboard or a "soft" keyboard generated on a touch screen display. The user interface 125 is configured to receive user input to access and interact with one or more software applications stored in memory 128.

The electronic processor 126 may include at least one processor or microprocessor that interprets and executes a set of instructions stored in the memory 128. The memory 128 includes an operating system 130 and software applications 132. In the example shown, the operating system 130 includes a graphical user interface generator 131 that creates a graphical user interface. The software programs 132 are configured to, among other things, implement the methods described herein. The memory 128 includes volatile memory elements (for example, random access memory (RAM)), nonvolatile memory elements (for example, ROM), and combinations thereof. In some embodiments, the memory 128 has a distributed architecture, where various components are situated remotely from one another, but may be accessed by the electronic processor 126. In some embodiments, the electronic processor 126 is configured to encrypt data associated with PII and store the encrypted data in memory 128.

The data bus 129, or other component interconnection, permits communication among the components of the computing device 120. The data bus 129 may have additional elements, which are omitted for simplicity, such as controllers, buffers (for example, caches), drivers, repeaters and receivers, or other similar components, to enable communications. The data bus 129 may also include address, control, data connections, or a combination of the foregoing to enable appropriate communications among the aforementioned components. In some embodiments, the electronic processor 126 is configured to encrypt data associated with PII and store the encrypted data in memory 128.

Figure 3:
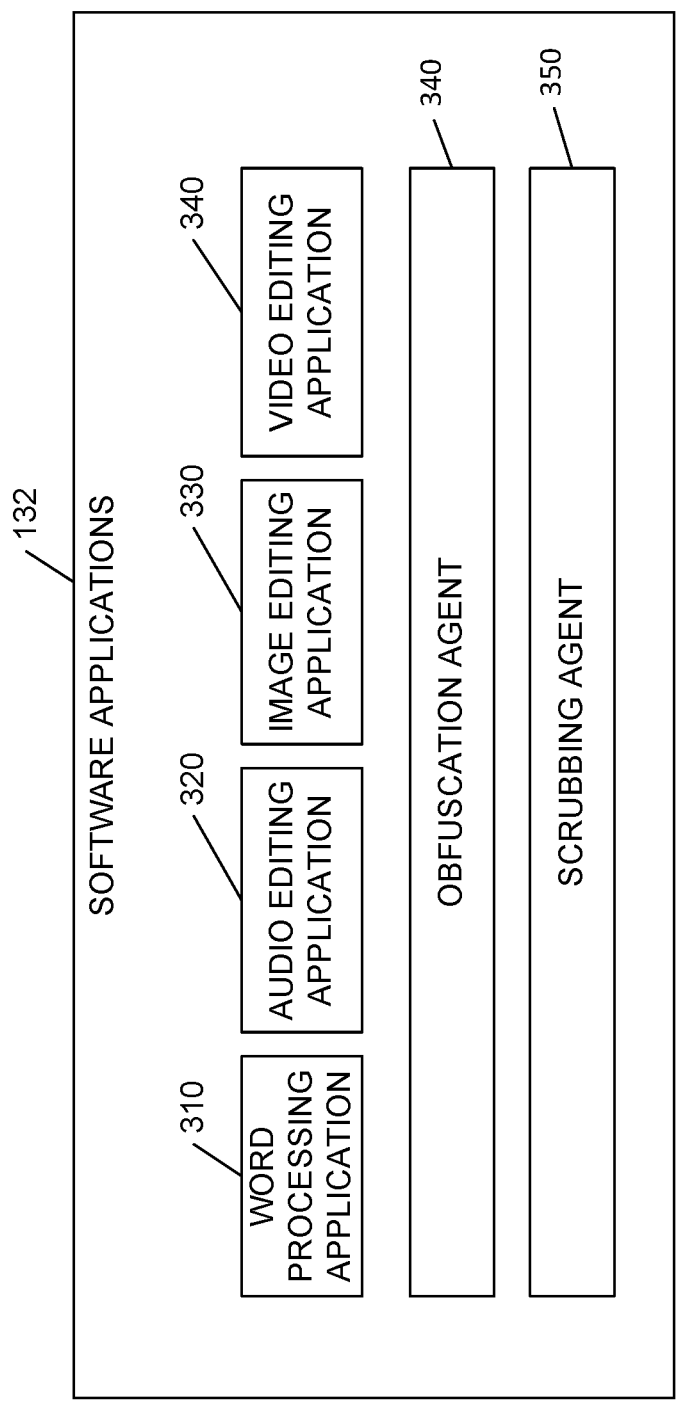
FIG. 3 is a block diagram showing several software programs stored in memory of computing device shown in FIG. 2, in accordance with some embodiments.

FIG. 3 is a block diagram showing several software applications 132 stored in memory of computing device shown in FIG. 2, in accordance with some embodiments. In some embodiments, software applications 132 include a word processing application 310, an audio editing application 320, an image editing processing 330, a video editing application 340, an obfuscation agent 340 and a scrubbing agent 350. The several software applications 132 is executed using the electronic processor 126 in the computing device 120.

The obfuscation agent 340 interacts with the obfuscation engine 480 to process and obfuscate data that contain personally identifiable information collected from users 102. Examples of types of data that may be saved include, but are not limited to, collection of textual data, audio data, video data, any embedded imagery, charts within a document, etc.

The scrubbing agent 350 processes the saved data based on rules stored in the rules database 112. The scrubbing agent 350 may be a standalone application or an integral component of another application. Although illustrated and described as being executed in a single computing device, the obfuscation agent 340 and the scrubbing agent 350 may be distributed and/or executed across many computing devices. In some embodiments, the scrubbing agent 350 and/or the scrubbing application 460 includes different engines that perform different types of actions on documents. In various embodiments, the scrubbing agent 350 and/or the scrubbing application 460 includes a parsing engine (for example, to identify possible PII), and a processing engine (for example, to use rules from the data base 112 to determine whether a plain text, image, audio, and/or video includes PII based on comparison with reference data stored in client database 106. The parsing engine performs processing actions responsible for various tasks, for example, parsing fields within a document or media file containing personally identifiable information or forwarding the identified field to a child parser which can break the field into smaller components (for example, subfields or name/value pairs). In some embodiments, a filtering engine is provided that performs filtering actions that determine whether a field within a document needs to be processed (for example, to determine whether an audio or video component in a document needs to be processed.

The word processing application 310, the audio editing application 320, the image editing application 330, and the video editing application 340 either alone or in combination provides a platform for the user 102 to compose, edit, format, print, or play documents or media files that contain personally identifiable information. In one example, the word processing application 310, the audio editing application 320, the image editing application 330, and the video editing application 340 includes an extension or a feature that allows the respective application to access the client database 106 to retrieve client identifier references associated with personally identifiable information within documents accessed by user 102. In some embodiments, the system 100 is designed to identify likely PII (for example, identifying common names of an individual or organization, the voice or a picture of an individual, etc.). In some embodiments, when network connectivity is not available or in an architecture where no central database 106 is available, the personally identifiable information in a document may be encrypted and saved along with the document instead of storing the encrypted personally identifiable information in a centralized client database.

Figure 4:
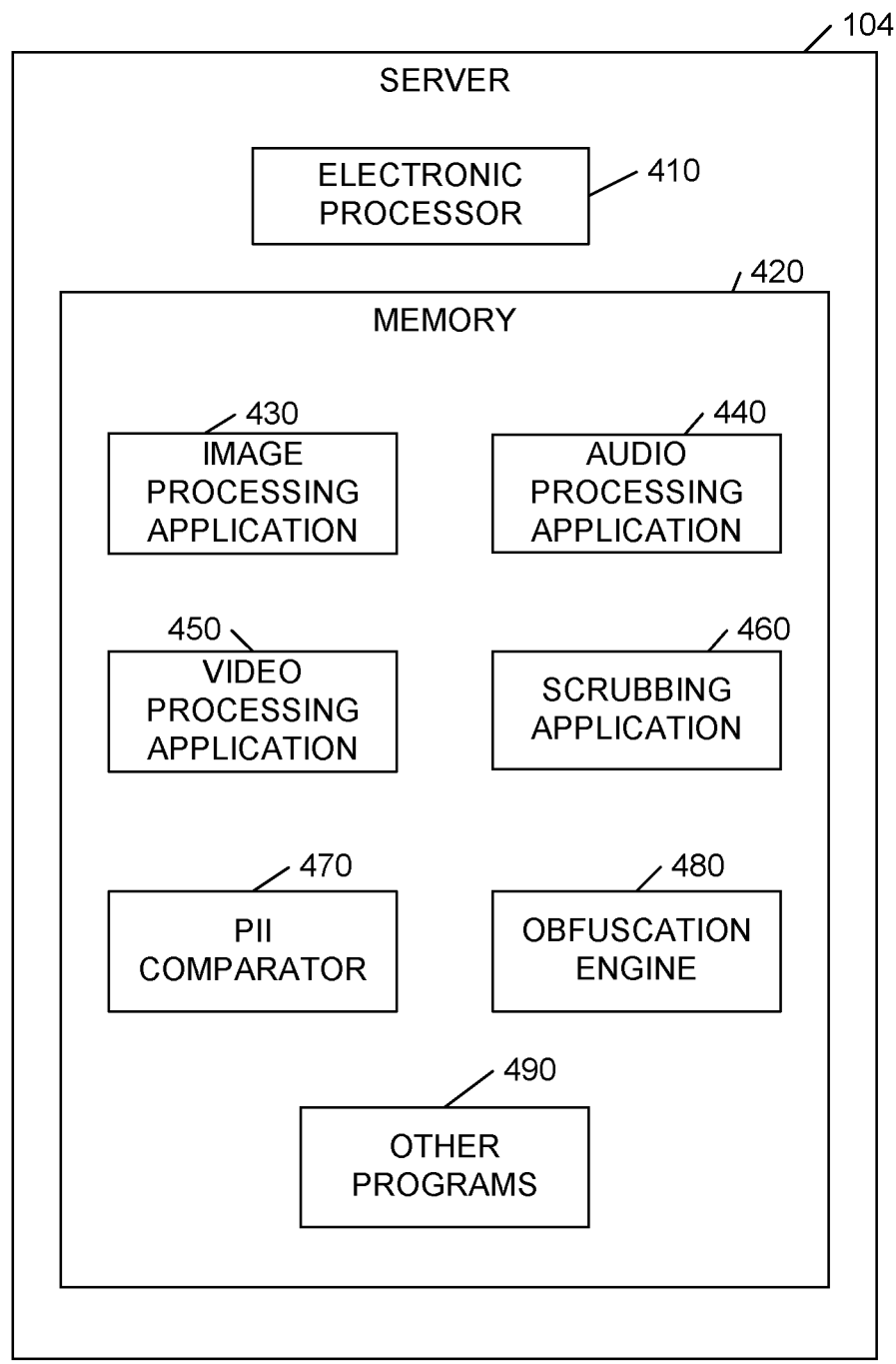
FIG. 4 is a block diagram of the server shown in FIG. 1, in accordance with some embodiments.

FIG. 4 is a block diagram of the server 104 shown in FIG. 1, in accordance with some embodiments. The server 104 includes electronic processor 410 and a memory 420 including one or more software application(s). The computing device 120 accesses software application(s) in memory 420 of server 104 through the network 103. The software application(s) can include, without limitation, an image processing application 430, an audio processing application 440, a video processing application 450, a scrubbing application 460, a PII comparator 470, an obfuscation engine 480 and other programs 490. The image processing application 430 includes software programs capable of processing still images and determining whether images that include personally identifiable information associated with an individual are present in a document.

Image files can be scanned for PII by, for example, running Optical Character Recognition (OCR) algorithms over their contents. In one instance, the image processing application 430 detect characters in images and convert them into text that can be processed. In some cases, the algorithms may infer that an element of an image is a character, but without 100% certainty. In such cases, it may be advisable to include the suspected character within the analysis (optionally assuming it passes a certain minimum threshold) to ensure all PII is detected.

In addition, faces can be detected by using facial recognition algorithms, which may use the placement of elements suspected to correspond to eyes, mouth, nose, etc. to detect a face. These faces can be matched against a database of known faces using machine learning or other means to find the person corresponding to the face. Such databases could be held within an organization, or they could be obtained from sources such as commercial databases, police databases, social networking sites or a combination of sources. Object recognition algorithms may also be used to detect other potential PII, such as the appearance of a birthday cake that would allow a viewer to determine an individual's birthday when combined with the image's metadata (or a date placed in the corner of the photo).

Alternatively, the individual entering the image into the system can highlight a region of interest and mark it as PII. In some embodiments this is performed through standard image editor region selection tools. A combination of user input and automated detection can be employed. Once the PII has been identified, it can be encrypted. This can be performed by taking each pixel or group of contiguous pixels and encrypting them within the image. This encrypted region can be placed within the image, covering the original data. To allow authorized users to decrypt the region, the metadata associated with the file may include information on the encrypted region (for example, the coordinates of the top left and bottom right corners where the region is rectangular) and an identifier that can be sent to the server 104 for requesting access. Access can be granted through the delivery of the decryption key if the user is authorized. Expanding the file metadata in this way is permissible, as the metadata associated with images can be expanded without any or with reduced conflict with the majority of existing image processing software. Alternatively, the metadata can be stored in a "sidecar" file that is delivered alongside the image, such as one in Adobe's Extensible Metadata Platform (XMP) file format. In some embodiments, an element of metadata is stored for each PII region, allowing different individuals to be stored in different parts of the image with retrieval corresponding to whether the user has authorization to view each individual in question.

Instead of encrypting the data and later delivering the decryption keys, it is possible to replace the personally identifiable information elements with a specific pattern. This could include all black pixels, all white pixels, all transparent pixels, all pixels of a different specific color or pixels constituting a known pattern. It could also include pixilation or blurring of the underlying image, which would have the advantage of not obscuring large chunks of the image, but the level of pixilation or blurring should be sufficient to mask the PII (for example, make it undetectable to human detection). In such cases, the level of pixilation or blurring could be determined based on the risk. For example, a face in the background may not require as much blurring due to its smaller size than a face in the foreground. The metadata (stored in the same way as before) would identify the data required to request access from the server 104. In this case, the server 104 stores the removed element of the image and the removed element is delivered to the user requesting access (if authorized) for reassembly into the final image.

In another example, the PII pixels are replaced with the metadata directly inside the image. This is performed by including a known marker in the file that is unlikely to occur in real images such as five pixels of specific colors in a specific combination. After this, the metadata for identifying the PII is placed within the pixels, after performing a direct conversion of the metadata text to image data. A known indicator, perhaps the same as the first, can be used to identify the end of the region. This solution has an advantage of not requiring external metadata (and therefore reducing storage requirements). However, a PII region may not be sufficiently large for storing the metadata. In this case, the PII region could be expanded. A disadvantage of expansion is that non-PII regions are obscured. Another difficulty is that PII may be spread over multiple lines of an image so that each line would include an essentially independent region (this occurs because image file formats tend to store data line-by-line.) The challenge of multiple lines may be addressed by including a reference to the first line within the subsequent lines, to reduce the data processing required. For this embodiment, the missing data is obtained from the server 104.

A combination of methods could be used for different parts of the file. For instance, PII such as faces could be obscured by blurring, whereas PII such as text could be entirely encrypted. The metadata would track the technique used to facilitate later retrieval. Reassembling the image can be performed by replacing pixels with other pixels using a data blob from the server 104. In all these cases, an unauthorized user for example would see the redacted image with either a meaningless encrypted pixels or a pattern to make it undetectable to human detection.

Audio files can be treated in a comparable way to images. Algorithms for converting speech to text (speech-to-text algorithms) can be used for determining the words spoken in an audio file. In this way, words such as names or other PII can be detected for redaction. Voice recognition algorithms can also be employed for determining the speaker from a database of known "voiceprints" using machine learning and/or other means. Alternatively, the user entering the audio file into the system can select (on a timeline or similar) the elements of the audio file that require encryption. As for images, a combination of manual and automated entry can be employed.

The audio processing application 440 includes software programs capable of processing audio data and determining whether the audio includes personally identifiable information associated with one or more individuals is present within a document. In some embodiments, the audio processing application is configured to process multiple channels associated with audio received from a surround sound system (for example, a 5.1 surround sound system). In one example, when PII information is audible through one or more of the channels of such surround sound systems, markers may be used to indicate the channels affected along with the times affected within each channel associated with the audio signal. In some embodiments, a received audio may be split up into several frequencies along its spectrum and several equalizers may be used to increase or decrease volume in a specific frequency range. In some embodiments, when PII is embedded in only a specific frequency range of frequencies (for example, in the bass region), the audio is processed in such a manner to reduce the bass frequencies to obfuscate the bass region of the audible frequency spectrum. Additionally, time markers associated with the PII portion in the audio signal may also include optional data referencing a frequency range having a lower bound and an upper bound associated with the frequency range. In some embodiments, the PII contained in the audio is obfuscated using an item selected from the group consisting of a tone, a beep, another audio (for example, a filler music) and a period of silence.

In some embodiments, the PII audio elements are stored in the same way as they were stored for the image file. They can be encrypted and inserted into the audio file itself. However, this carries the risk that the encrypted audio will contain sudden, loud noises that may be hazardous to hearing. Therefore, the associated metadata (in the audio file itself or associated sidecar file) can be used by the audio player to skip the redacted elements for unauthorized users. The same problem and solution exist for insertion of the metadata directly into the audio file. In other instances, the PII is replaced by an absence of sound, by a pattern such as white noise, or by a muffled version of the PII (with the proviso that the muffling would need to be sufficient to obscure the PII). In some embodiments, the original version of the audio is stored on the server 104 for retrieval by authorized users. In some embodiments, where the audio file is encrypted, the user is sent the appropriate encryption keys to gain access to the PII portion of the document.

Video files can be treated as a combination of audio and image files. The audio tracks for the video (either considered individually or in combination where multiple tracks exist, for example, stereo or Dolby 5.1 surround sound) can be processed as for audio files. The individual frames of the video can be processed in the same way as individual image files. Either of the aforementioned encryption or removal techniques may be applied, and with different techniques for different elements. In one example, the audio PII is replaced by white noise while the image PII is encrypted. For the images, additional advanced techniques may be used, depending on the nature of the input. In some embodiments, removal of motion blur is desirable for accurate image detection. Alternatively, processing of multiple frames in sequence using machine learning and other means to detect objects is used to detect PII. Processing multiple frames in sequence can provide more context. For example, an element that is to the side of a frame may be insufficient for object recognition, but it may become meaningful when the entire object can be seen in another part of the video. In some embodiments, special consideration is given for situations where the combination of audio, graphical text, image and video elements taken together constitute PII, but where neither of these alone would be sufficient to constitute PII. This can be performed by combining the text and other data generated by the processing before running the PII detection process. For example, in a scenario where a house is shown in a video with a house number and a street sign and having an owner talk about an neighbor across the street. In this case, the PII could be the video, the audio, or both together. In such situations, the electronic processor is 410 is configured to perform further processing using various rules and contexts stored in the rules and context database 112 to determine and obfuscate portions of the audio and video that in combination constitutes personally identifiable information.

In some embodiments, the scrubbing application 460 locates and replaces personally identifiable information in documents using the rules and context information stored in rules and context database 112. In some embodiments, the scrubbing application 460 is a distinct application in itself capable of opening a document file and enabling a user to work through the document contents to scrub information (for example, PII) within the document by locating and replacing particular text, image, audio, and/or video. When the parsing process within the scrubbing application 460 identifies PII, a post-processing operation to prepare the message for storage in a data store (for example, shared storage 108) is performed. In some embodiments, the post-processing operation includes an annotation operation that annotates the document with additional information that is needed to properly interpret the data in the document when the document is added to a data store (for example, in the case of documents that have not been scrubbed before). In some embodiments, when documents are received by an application that does not have an annotation operation, the application uses the previous annotation (for example, stored in a database/memory) and applies it to these documents.

In some embodiments, the client identifier includes a plurality of segments to indicate several pieces of information. For example, a first segment may be associated with an individual and a second segment that may be associated with an organization. A third segment that may be associated with a group or company (having a hierarchy), or a fourth segment that may be associated with a client database lookup system (for example, checking passport numbers).

Figure 5:
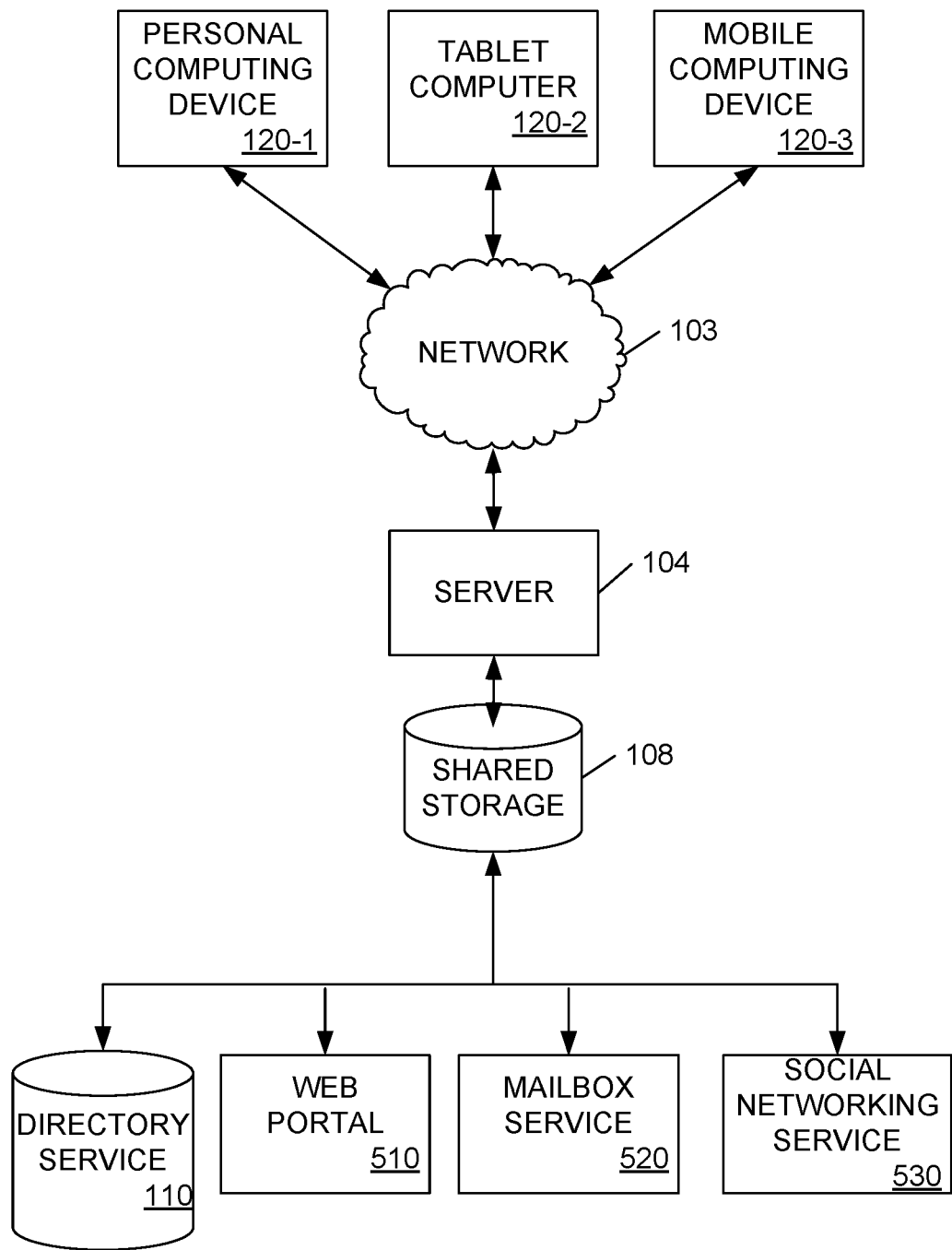
FIG. 5 is a block diagram of a distributed computing system in which embodiments provided herein may be practiced.

Other information that may be added to the document includes, for example, the document source (for example, a server identifier). In some embodiments, a protected record storage operation is performed that sends the scrubbed document with the PII in a protected or obscured format to a data repository (for example, shared storage 108). Once in the data repository, the scrubbed documents are available for use by various consumers of the data FIG. 5 is a block diagram of a distributed computing system in which embodiments provided herein may be practiced. Content developed, interacted with, or edited in association with the software applications 132 may be stored and retrieved from different servers, communication channels, or other storage types. For example, various documents may be stored using a directory service 110, a web portal 510, a mailbox service 520, or a social networking service 530. The software applications 132 may use any of these types of systems or the like for enabling data utilization, as described herein. The server 104 may also provide software applications 132 over the web to clients through the network 103. By way of example, the client computing device may be implemented as the computing device 120 and embodied in a personal computing device 120-1, a tablet computer 120-2, and/or a mobile computing device (for example, a smart phone) 120-3. Any of these embodiments of the client device may obtain content from the shared storage 108.

Figure 6:
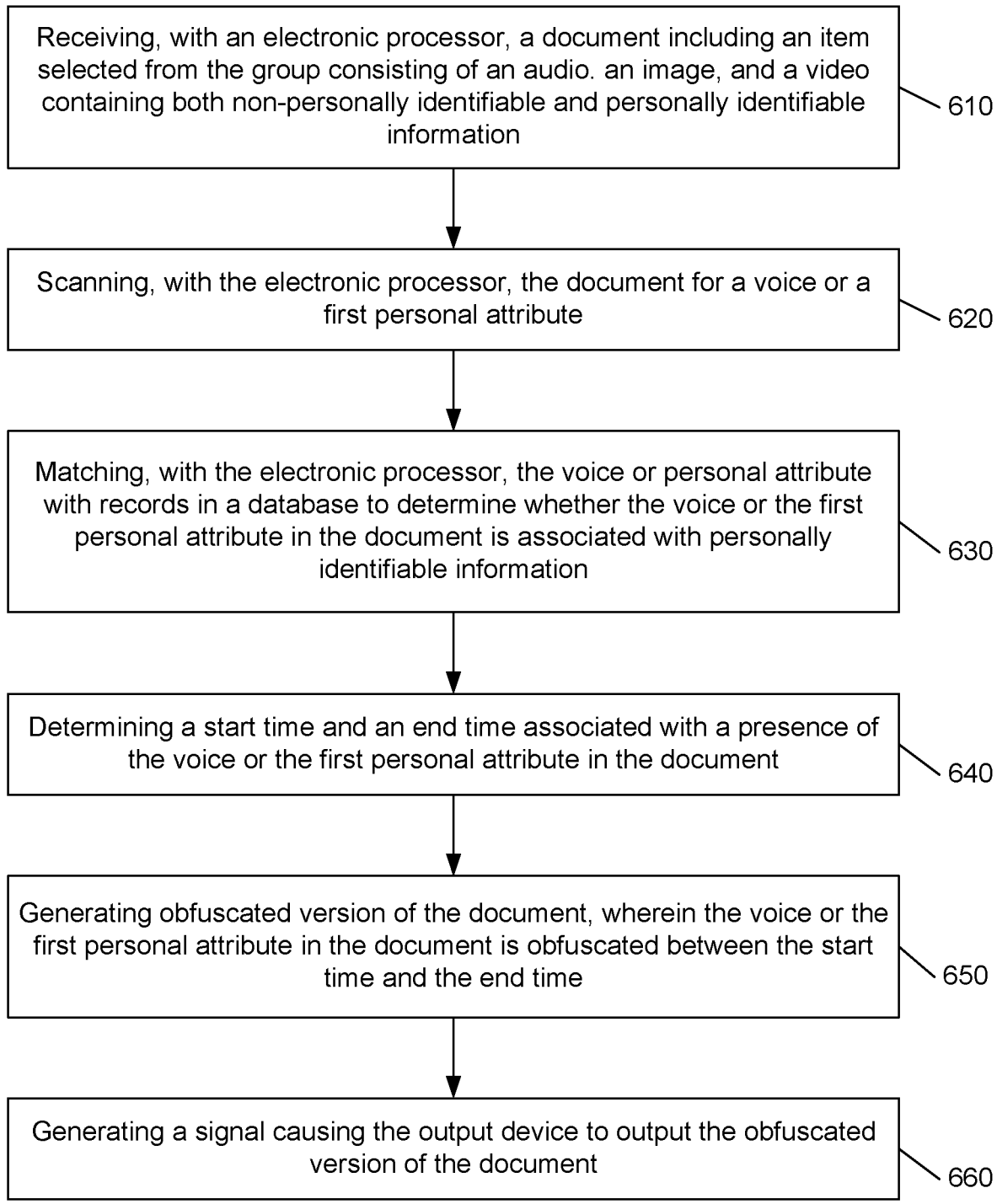
FIG. 6 and FIG. 7 are flow charts illustrating methods for protecting personally identifiable information, in accordance with some embodiments.
Figure 7:
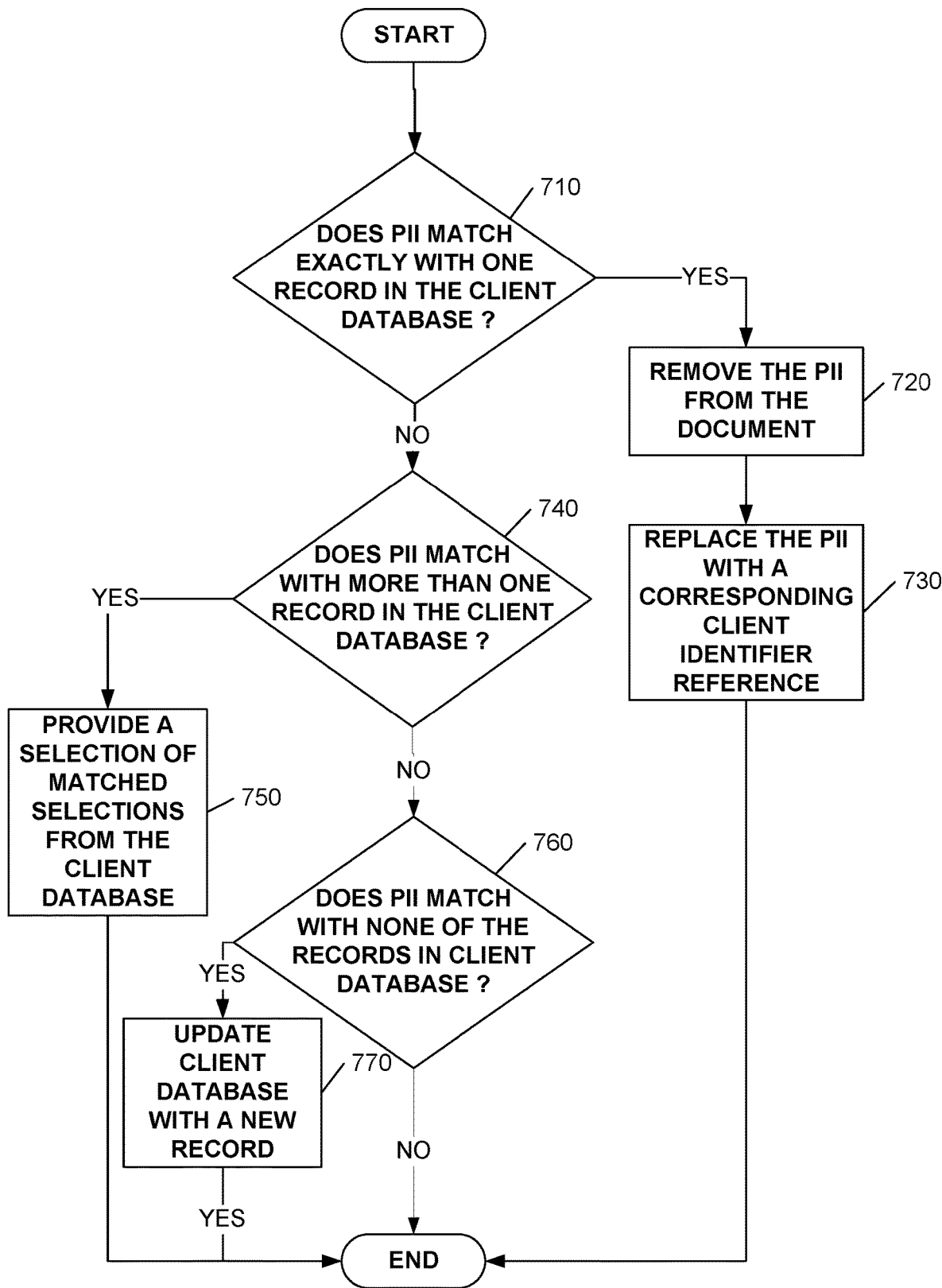

FIG. 6 and FIG. 7 are flow charts illustrating a method for protecting personally identifiable information, in accordance with some embodiments. At block 610, the electronic processor 410 receives, from a shared storage 108, a document including an item selected from the group consisting of an audio, an image, and a video containing both non-personally identifiable information and personally identifiable information. At block 620, the electronic processor 410 scans the document for personally identifiable information for a voice or a personal attribute (for example, a name, a title, a description, a picture or other textual, audio, image or video information associated with an individual, entity etc.). In some embodiments, scanning the document includes converting the image, audio, and/or video data into text and analyzing strings of text by converting the text into logical syntactic components that may be used to determine the presence of personally identifiable information.

At block 630, the electronic processor 410 matches the voice or the personal attribute with records stored in the client database 106 and determines whether the voice or the personal attribute is associated with personally identifiable information. In one example, the personal attribute is associated with personally identifiable information based on converting audio data into textual information and parsing the textual information for personally identifiable information. In some embodiments, parsing the textual information for personally identifiable information includes parsing for one or more items selected from the group consisting of name, date of birth, place of birth, email address, phone number, fax number, particular content, social networking credential, biometric information (including fingerprint, voice, facial data, etc.), financial account number, organization issued identification, and government issued identification. In response to determining that the voice or the personal attribute is associated with personally identifiable information, determining a start time and an end time associated with the presence of the voice or personal attribute in the document (block 640). In some embodiments, the electronic processor 410 determines whether the personally identifiable information matches exactly with one record in the client database 106 (block 710). In one example, when a match with exactly one record is determined the personally identifiable information is removed from the document and replaced with a client identifier reference (block 730). In some embodiments, when it is determined that there is more than one record associated in the client database, the matched selections are provided to the user (block 750). On the other hand, if none of the personally identifiable information matches with records in the client database 106, then the client database is updated with a new record (block 770).

At block 650, the electronic processor 410 generates an obfuscated version of the document, wherein the voice or the personal attribute in the document is obfuscated between the start time and the end time. At block 660, the electronic processor 410 generates a signal causing the output device (for example, speaker 122) to output the obfuscated audio in the obfuscated version of the document. In some embodiments, the electronic processor 410 is configured to retrieve all documents containing personally identifiable information associated with an individual. The electronic processor 410 may also be configured to delete all the documents containing personally identifiable information associated with the individual.

Embodiments provided herein use the client database 106 to enumerate a full list of clients (for example, users, individuals, customers, businesses, etc.), which may be referenced in documents. Each record refers to an individual client. In some embodiments, the client database 106 is accessible based on an authorization level associated with a user accessing the database. In one embodiment, the record may facilitate online interaction and thus contain a username (which may be an email address) and some form of password (either typed characters, or phone-based authentication, or fingerprint, etc.). In one example, when a customer asks for instant retrieval and deletion of all documents held about them, the request may require further determination of the appropriate individual. In such cases, characteristics associated with the document (for example, the time when the data such as a document including audio and/or images was created, edited, or deleted) may be used to determine the identity of the appropriate individual among the multiple choices available in the system.

In some embodiments, the electronic processor 410 is configured to provide implicit client recognition by prompting the user 102 to confirm his or her identity with the name or other identifying information in the document (for example, an address, or a picture of the user). In some instance, the author is provided with a prompt to explicitly select from a set of potential matches as to which individual is being envisioned as the author. In some embodiments, the potential matches are ranked based on relevance to the user. In other instances, all potential matches of individuals may be stored and not be displayed to the user if, for instance, it is determined that the author has a low level of access rights. Additionally, when the document is being deleted, the electronic processor 410 provides a request for each potential match whether the user referenced is the actual user in those cases. In some embodiments, additional data about users is recorded in the database regarding when the document was entered into the system and when it was deleted. In this case, the system 100 is configured to determine the identity of the individual based on information in the document. In some embodiments, the time of deletion of documents is used to determine the identity of the individual envisioned by the user.

In some embodiments, the client may use a cryptographic key associated with the client, and have all of the textual, audio, image, and/or video data that includes personally identifiable information encrypted and stored within the document itself rather than being stored in a centralized data store (for example shared storage 108). In operation, when the user's client application (for managing PII embedded in documents) is first opened, it detects that there is no key stored locally and sends a request to the client database 106 for local encryption keys. The server 104 sends back all keys the client is entitled to use, according to the user's authorization level. The same process is performed once the client detects that a key has expired (although in this case only a single key would need to be fetched), determined using metadata stored as part of the key, by querying the client database 106 for the expiry date and recording these details locally, or by similar methods.

In some embodiments, the user's client application may also have initial keys embedded in the application. This allows a user to start the application without having a network for requesting the keys. In some embodiments, the server 104 delivering the client application prepares the application for a specific user, in which case the user would receive the keys to which they are entitled.

When offline, the client application can use the retained encryption key for encrypting and decrypting metadata in documents. The metadata may contain information about the keys required for decryption, either directly in the document or via metadata provided by an online service comprising a table mapping identifiers to encryption keys. In either case, when the user does not have a required key, the information will appear redacted to the user.

While online, the client application may continue to use the retained keys, or it can request new keys from the client database 106. Performance gains can be realized by using the retained keys, and new keys can be asynchronously requested as a background task to ensure keys stay up to date. In some embodiments, it is also possible to revert to performing decryption on the server 104 (or some other endpoint) while operating in the online mode.

When the encryption keys are leaked (deliberately or inadvertently), it will cause a security incident as PII can be decrypted. In this case, the client application would be delivered new keys to replace the old affected keys when it next connects to the database. These would be marked as a priority, so that the client application would immediately use the old keys to decrypt all documents containing PII encrypted with those old keys before then using the new keys to re-encrypt the data. At this point, the old keys would be deleted. This task would also be performed during a normal, scheduled key rotation, which could be performed in case a key was leaked but this was not detected.

In the above described scenario, other clients sending documents encrypted with the old key cannot be read by those clients that have deleted their copy of the old key. To enable more seamless operation, the client may retain old invalidated keys for a fixed period of, say, 30 days. In some embodiments, a policy of requiring clients to connect to the database at regular, defined intervals may be established to ensure new keys are retrieved at regular intervals. This allows compromised keys to be quickly rotated out of all client applications. In some embodiments, the expiry date of keys may be set to a shorter duration than is typical so that keys are changed regularly and the impact of any unknown leaks are mitigated. This alleviates the problems associated with distributing keys to multiple entities that may not be as easy to keep secure as a centralized system (or one distributed to only a small number of endpoints).

In some embodiments, the document is used by other software applications, which may have limited compatibility with the personally identifiable information retrieval service. Such applications may render only the document's plain text but may not be able to call the personally identifiable information retrieval service. As a consequence, these applications are unable to show or decrypt the personally identifiable information. In some embodiments, when a document is sent outside of the organizational boundary (for example, from one attorney's office to another attorney's office), the receiving user does not have authorization to access the client's database used to create the reference. As a consequence, the user sees the document including redacted portions. In other examples, the receiving user may be able to request access authorization from the sending user. In some embodiments, this may be granted by creating a new user identity in the directory service and associating the relevant client records with that user identity and sharing the new user identity with the receiving user. In some embodiments, personally identifiable information that has been scrubbed can be shown on a dashboard that lets a user 102 view or delete documents that reference the user or other clients.

Figure 8:
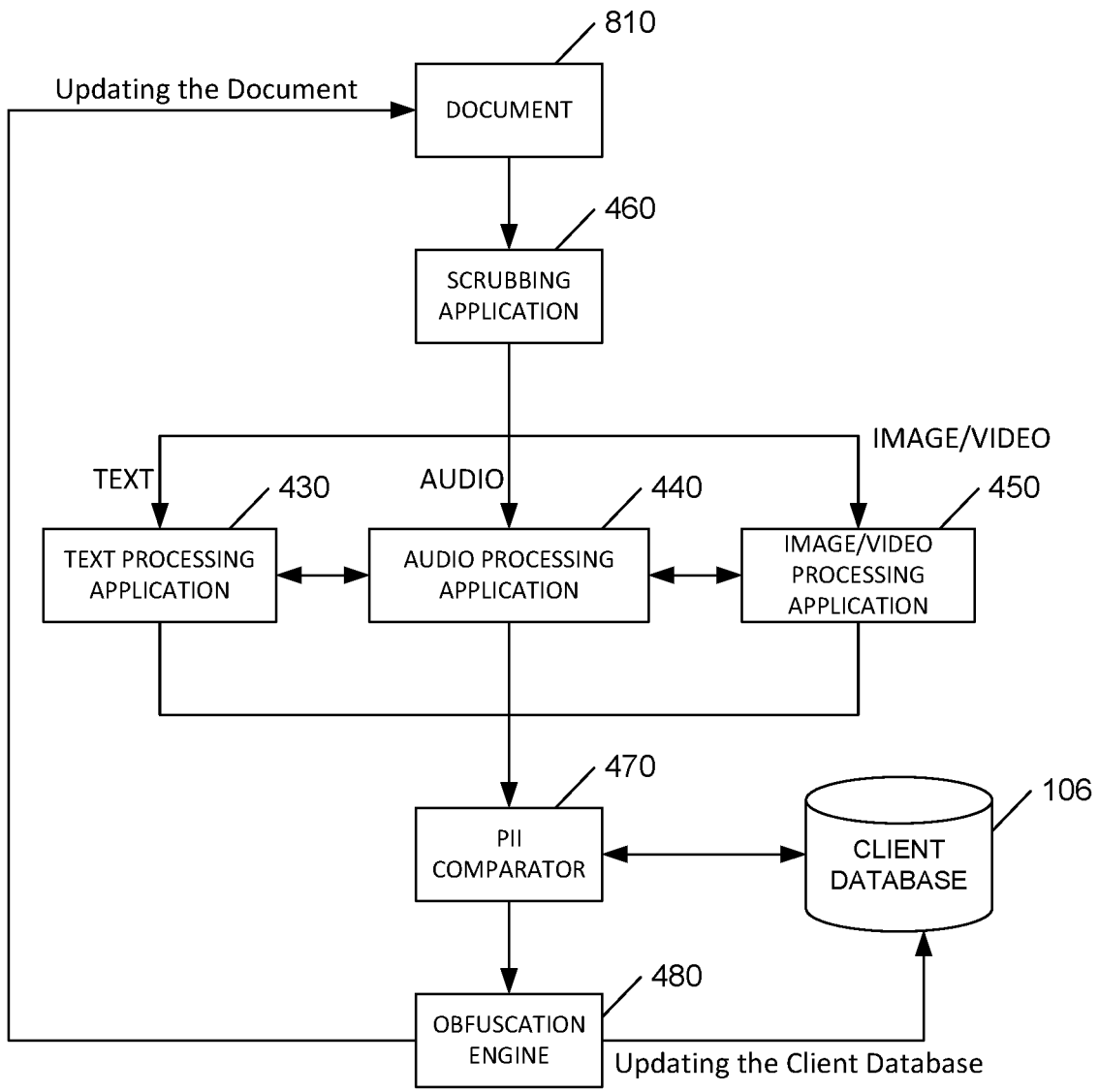
FIG. 8 is a block diagram illustrating a process for obfuscation of personally identifiable information, in accordance with some embodiments.

FIG. 8 is a block diagram illustrating a process for obfuscation of personally identifiable information, in accordance with some embodiments. In the example provided, a document 810 is provided to a scrubbing application 460. The scrubbing application 460 performs processing actions responsible for tasks, for example, parsing fields within a document containing personally identifiable information or forwarding the identified field to a child parser which can break the field into smaller components (for example, subfields or name/value pairs). The scrubbing application 460 determines whether a field within a document needs to be processed and the type of processing (for example, graphically rendered text, audio or image/video processing) that needs to be performed. In one example, the portion of the document that requires image processing is provided to the image processing application 430. In one example, the portion of the document that requires audio processing is provided to the audio processing application 440. Similarly, the portion of the document that requires video processing is provided to the video processing application 450.

The image processing application 430, audio processing application 440 and the video processing application 450 interface and operate with each other to determine the presence of personally identifiable information present in one or more of graphically rendered text, audio, image/video formats within the document 810. Once the portions of the document including personally identifiable information are determined, is the portions are compared with records in the client database 106 to determine the individuals associated with the personally identifiable information. For example, the voice in an audio attachment to the document 810 is processed by the audio processing application 440 and the voice characteristics of the processed voice is compared with stored records in the client database 106 using the PII comparator 470. In another example, an image within document 810 is processed by the image processing application 430 and the facial image characteristics of a face shown in the image are compared with stored records in the client database 106 using the PII comparator 470. In some embodiments, image data, audio data (for example, speech data) and video data contained in the document 810 is converted by the image processing application 430 and the audio processing application 440, and video processing application 450 to determine the presence of personally identifiable information. In some embodiments, the electronic processor 410 is configured to determine whether multiple non-personally identifiable information can be combined to constitute personally identifiable information using several rules and contexts available in the rules and context database 112. Upon determining the presence of personally identifiable information using the PII comparator, the obfuscation engine 480 obfuscates portions of the document 810 that contain personally identifiable information. In one example, portions of speech data that include personally identifiable information (for example, an individual's name, date of birth, etc.) is obfuscated by the obfuscation engine 480.

Figure 9A:
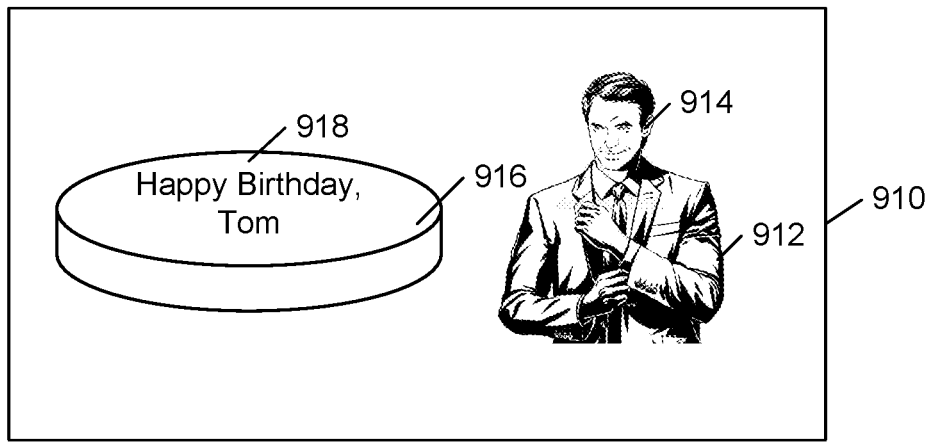
FIGS. 9A and 9B illustrate an example image that is scrubbed to have the PII obfuscated, in accordance with some embodiments.
Figure 9B:
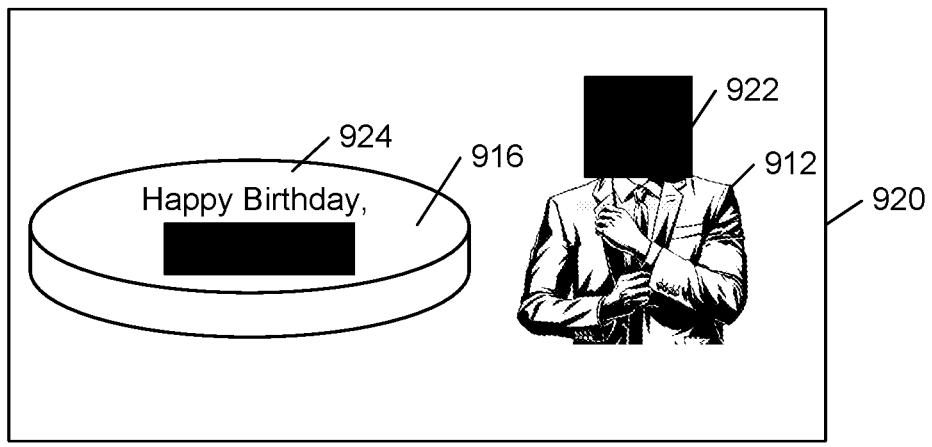

FIGS. 9A and 9B illustrate an example image that is scrubbed to obfuscate the PII. FIG. 9A illustrates an image 910 that includes a picture 912 of an individual and an image of a birthday cake 916. The picture 912 includes a facial image 914 of the individual. The image of the birthday cake 916 includes text 918 that has "Happy Birthday Tom" written on the cake. In operation, the systems and methods described herein analyze the picture 912 and the image of the cake 916 and determine the portions of the image that includes personally identifiable information. In the case of the picture 912, the facial image 914 of the individual is analyzed and facial characteristics are compared with stored images in client database 106 to determine the identity of the individual. The facial image 914 is obfuscated depending on the determined identity of the individual. As shown in FIG. 9B, a black box 922 is used to cover the facial image 914 to obfuscate the identity of the individual. In addition, the text "Tom" is also covered with a black box to obfuscate the name of the individual shown on the birthday cake.

In some embodiments, systems and methods disclosed herein leverage one or more search services, which scan the various data repositories that an organization may use. For example, a user may sign in using their electronic identity for authentication. Since this electronic identity is tied to (or is the same as) their client identifier, the search retrieves all documents that contain their client identifier. The user may then view all documents that contain references to them. In the event the document they read also contains references to other clients, the personally identifiable information relating to the other clients is redacted. In some embodiments, the user 102 may not see all these on the display 123 immediately since further workflows may be triggered, which may include dynamically verifying that a given document is allowed by policy (for example, according to a rules provided in a rules and context database 112) or law to be released back to the customer, or is not subject to a lawsuit. In other examples, the workflow includes a final manual review of the information retrieved by the personally identifiable information retrieval service. In some embodiments, the system 100 stores all documents containing a particular client identifier. Storing documents in this manner facilitates supplying all data associated with a user when it is requested by the user. This also prevents malicious users from inserting random client identifiers into a document with the hope of gaining access. In some embodiments, a user 102 (for example, a clerk) may work with a client in-person to give them printouts of all documents related to the client with all PII of other clients redacted from the document. In some embodiments, the client may request deletion of PII information of the client in all documents associated with an organization or institution. In such cases, the personally identifiable information protecting system ensures that the rest of the document remains intact while the PII is redacted from each document. Further annotation (for example, either at a document template level, or manually by the document author) can determine if the full document is deleted or is simply redacted. Additionally, the settings for protecting PII in documents can be pushed into one or more author's application (for example, a word processing application) at the client database level or through an operating system group policy.

The embodiments described and illustrated in the above description and accompanying drawings are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component.

In the embodiments provided, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between entities or actions.

Various features and advantages of some embodiments are set forth in the following claims.

What is claimed is:

1. A computer system for protecting personally identifiable information (PII), the computer system comprising:
an output device;
an electronic processor electrically coupled to the output device and configured to:
receive a data set containing both non-personally identifiable information and personally identifiable information;
scan the data set for a first personal attribute;
match the first personal attribute with one or more records in a client database and determine whether the first personal attribute in the data set is associated with personally identifiable information associated with a client identifier in the client database;

determine a start time and an end time associated with the first personal attribute in an audio data in the data set;

generate an obfuscated version of the data set, wherein the first personal attribute in the audio data is obfuscated between the start time and the end time; and generate a signal causing the output device to output the obfuscated version of the data set.

2. The computer system of claim 1, wherein the data set includes personally identifiable information included in an item selected from the group consisting of graphically rendered text, audio, image, and video data.

3. The computer system of claim 1, wherein obfuscated audio data includes an item selected from the group consisting of a tone, a beep, a second audio and a period of silence to replace the voice or the first personal attribute.

4. The computer system of claim 1, wherein determining that the first personal attribute is associated with personally identifiable information includes converting the audio into textual information and parsing the textual information for personally identifiable information.

5. The computer system of claim 4, wherein the textual information for personally identifiable information includes an item selected from a group consisting of name, date of birth, place of birth, email address, phone number, fax number, particular content, social networking credential, biometric information, financial account number, organization issued identification, and government issued identification.

6. The computer system of claim 5, wherein the electronic processor is further configured to in response to the personally identifiable information matching none of the records in the client database, update the client database with a new record associated with the personally identifiable information.

7. The computer system of claim 1, wherein the electronic processor is further configured to scan the data set for a facial image;

match the facial image with records in the client database to determine whether the facial image in the data set is associated with personally identifiable information associated with the client identifier in the client database;

in response to determining that the facial image is associated with personally identifiable information, obfuscate the portion of an image including the facial image;

generate an obfuscated image including an obfuscated facial image; and display the obfuscated image.

8. The computer system of claim 1, wherein the client database is accessible based on an authorization level associated with a user.

9. The computer system of claim 1, wherein the electronic processor is further configured to delete all data sets containing personally identifiable information associated with an individual.

10. A method for protecting personally identifiable information of entities, the method executed via an electronic processor and comprising:

receiving a data set including an item selected from the group consisting of graphically rendered text, an audio file, an image, and a video containing both non-personally identifiable information and personally identifiable information;

scanning the document for a first personal attribute;

matching the first personal attribute with one or more records in a client database and determining whether the first personal attribute in the data set is associated with personally identifiable information associated with a client identifier in the client database;

determining a start time and an end time associated with the first personal attribute in audio data in the data set;

generating an obfuscated version of the data set, wherein the first personal attribute in the audio data is obfuscated between the start time and the end time; and generating a signal causing the output device to output the obfuscated version of the data set.

11. The method of claim 10, further comprising:

retrieving all data sets containing personally identifiable information associated with an individual; and deleting all data sets containing personally identifiable information associated with the individual.

12. The method of claim 10, wherein receiving the data set containing both non-personally identifiable data and personally identifiable information of one or more entities includes:

receiving the data set including personally identifiable information included in an item selected from the group consisting of graphically rendered text, audio, image, and video data.

13. The method of claim 12, wherein determining that the first personal attribute is associated with personally identifiable information includes converting the audio data into textual information and parsing the graphically rendered text for personally identifiable information.

14. The method of claim 13, wherein parsing the graphically rendered text for personally identifiable information includes parsing the graphically rendered text information for an item selected from a group consisting of name, date of birth, place of birth, email address, phone number, fax number, particular content, social networking credential, biometric information, financial account number, organization issued identification, and government issued identification.

15. The method of claim 10, further comprising:

updating the client database with a new record associated with the personally identifiable information, in response to the personally identifiable information matching none of the records in the client database.

16. The method of claim 10, further comprising:

scanning the data set for a facial image;

matching the facial image with records in the client database to determine whether the facial image in the data set is associated with personally identifiable information;

in response to determining that the facial image is associated with personally identifiable information, obfuscating the portion of the image including the facial image;

generating an obfuscated image including an obfuscated facial image; and displaying the obfuscated image.

17. The method of claim 10, further comprising:

accessing the client database based on an authorization level associated with the user.

18. A tangible non-transitory machine-readable medium containing computer-readable instructions that when executed by one or more processors cause the one or more processors to perform a method, the method comprising:

receiving a data set including an item selected from the group consisting of an audio file, an image file, and a video file containing both non-personally identifiable information and personally identifiable information;

scanning the data set for a voice or a first personal attribute;

matching or personal attribute with records in a client database to determine whether or the first personal attribute in the data set is associated with personally identifiable information associated with a client identifier in the client database;

determining a start time and an end time associated with the first personal attribute in the audio file;

generating obfuscated version of the data set, wherein the first personal attribute in the audio file is obfuscated between the start time and the end time; and generating a signal causing the output device to output the obfuscated version of the data set.

19. The tangible non-transitory machine-readable medium of claim 18, further comprising:

scanning the data set for a facial image;

matching the facial image with records in the client database to determine whether the facial image in the data set is associated with personally identifiable information;

in response to determining that the facial image is associated with personally identifiable information, obfuscating the portion of the image file including the facial image;

generating the obfuscated data set including an obfuscated facial; and displaying the obfuscated data set including the obfuscated facial image.

20. The tangible non-transitory machine-readable medium of claim 19, wherein determining that the first personal attribute is associated with personally identifiable information includes converting the audio file into textual information and parsing the textual information for personally identifiable information.

* * * * *